F. R. ELDRIDGE.
HAMMOCK HOOK.
APPLICATION FILED MAR. 12, 1910.

976,253.

Patented Nov. 22, 1910.

WITNESSES:

INVENTOR
Francis R. Eldridge
BY
ATTORNEYS

UNITED STATES PATENT OFFICE.

FRANCIS R. ELDRIDGE, OF NEW YORK, N. Y.

HAMMOCK-HOOK.

976,253.  Specification of Letters Patent.  Patented Nov. 22, 1910.

Application filed March 12, 1910. Serial No. 548,808.

*To all whom it may concern:*

Be it known that I, FRANCIS R. ELDRIDGE, a citizen of the United States, and a resident of the city of New York, borough of Manhattan, in the county and State of New York, have invented a new and Improved Hammock-Hook, of which the following is a full, clear, and exact description.

The invention is an improvement in hooks for attaching the suspending cords to a hammock, particularly navy hammocks, which consists of a length of canvas having eyelets in the hem at each end.

The enlisted men of the navy service have two hammocks and are required at frequent periods to change the soiled hammock for the clean hammock and scrub the former. The hammocks are suspended by a number of cords at each end, which pass from a ring and are tied at their free ends in the several holes or eyelets of the hammock. This requires the tying and untying of each cord when the hammock is changed. The holes in the hem of the clean hammock are often so shrunk as to cause considerable difficulty in passing the ends of the cords through them; and then the further difficulty is encountered in tying all of the cords precisely even; *i. e.,* so that none of the cords are slack and others tight. There is little chance of perfect uniformity in the application of the cords, and as a result the extra weight thrown on the tighter cords causes them to cut through the eyelets and soon render the hammock useless but practically sound, except where cut by the cords.

It is the object of the present invention to overcome these disadvantages, which I do by providing each suspending cord with a hook adapted to detachably engage in one of the eyelets of the hammock, the cord requiring no further adjustment after the hook is once applied, and the hook being relatively stiff so as to be easily engaged in the eyelet, and of a form to prevent its accidental disengagement and cause the suspending cord to draw thereon in the plane of the canvas or other material of which the hammock is made, the hook being preferably constructed of aluminum so as not to tarnish the eyelets of the hammock.

Reference is to be had to the accompanying drawings forming a part of this specification, in which similar characters of reference indicate corresponding parts in all the views.

Figure 1:
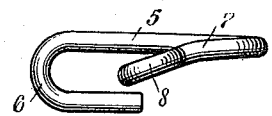
Figure 2:
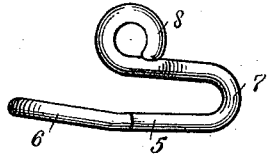
Figure 3:
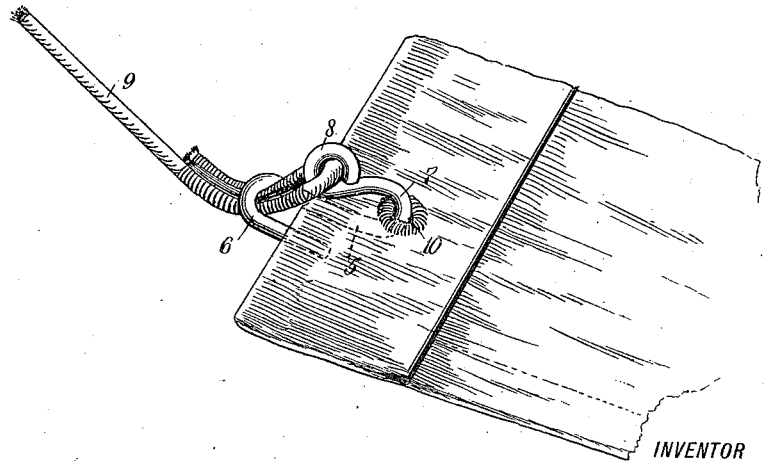

Figure 1 is a plan of a hammock hook constructed in accordance with my invention; Fig. 2 is a side view of the same; and Fig. 3 is a fragmentary perspective view illustrating the application of the hook to the hammock and suspending cord.

The hook in its preferred embodiment comprises a member 5, of wire, having one end turned inwardly in a lateral direction to provide a hook 6, and the other end turned inwardly in a vertical direction to provide a hook 7, the hooks being thus arranged in planes at approximately right-angles to each other. The point of the hook 7 is bent to form an eye 8 for receiving one of the suspending cords 9 of the hammock. The end of this cord, as shown in Fig. 3, after being passed through the eyelet and adjusted the proper length for the hammock, is suitably secured, ordinarily to remain permanently attached, as by the mousing and seizing shown. The eye 8, forming the point of the hook 7, is preferably laterally bent, as best shown in Fig. 1, to bring it over the longitudinal center of the hook 6, so that the tension on the suspending cord will not have a tendency to twist the hook in the hammock. The outer portion of the hook 6 is preferably bent slightly upward toward the eye 8, as shown in Fig. 2, so that the suspending cord after being engaged in this hook, as shown in Fig. 3, will pass from the hammock in substantially the plane thereof, whereby the strain on the suspending cord will not tend to pull the hook upwardly. This bending of the outer portion of the hook 6 also places the fork of the hook above its point, which obviously makes the accidental disengagement of the suspending cord less likely to occur.

In the use of the hooks, after they have been applied to the several suspending cords so as to give uniform strain on the hammock, each hook is engaged in its proper eyelet 10 of the hammock by first passing the point of the hook 6 through the eyelet and successively sliding the wire through until the eyelet is engaged with the hook 7, after which the suspending cord is engaged in the hook 6.

Having thus described my invention, I claim as new and desire to secure by Letters Patent:

1. A hammock hook comprising a wire member having one of its ends inwardly turned in a lateral direction and its other end inwardly turned in a vertical direction to provide hooks, with one of the hooks having an eye arranged to receive one of the suspending cords of the hammock passing through the other hook.

2. The combination of a hammock having an opening at the end, a member having a hook at each end, with one of the hooks engaged within the opening of the hammock, and a suspending cord secured to the hook engaged in the hammock and passing through the said hook.

3. A hammock hook comprising a member having inwardly-turned hooks at its opposite ends arranged at approximately right-angles to each other, with one of the hooks provided with an eye arranged to receive one of the hammock suspending cords passing through the other hook.

4. A hammock hook comprising a member having inwardly-turned hooks at its opposite ends, with the hooks arranged at approximately right-angles to each other and one of the hooks having an eyelet at the point laterally offset to lie approximately over the longitudinal center of the other hook.

5. A hammock hook comprising a wire member having hooks at its opposite ends arranged in planes at approximately right-angles to each other, one of the hooks having an eyelet arranged to receive one of the suspending cords of the hammock passing through the other hook, and the said other hook having the outer portion slightly turned toward the eyelet.

In testimony whereof I have signed my name to this specification in the presence of two subscribing witnesses.

FRANCIS R. ELDRIDGE.

Witnesses:
   F. W. HANAFORD,
   PHILIP D. ROLLHAUS.